(12) United States Patent
Firth et al.

(10) Patent No.: US 10,449,689 B2
(45) Date of Patent: Oct. 22, 2019

(54) IMPROVEMENTS TO ROUTER APPARATUS

(71) Applicant: Power Box AG, Zug (CH)

(72) Inventors: Robert Firth, North Yorkshire (GB); Andrew Linton, North Yorkshire (GB)

(73) Assignee: Power Box AG, Zug (CH)

( * ) Notice: Subject to any disclaimer, the term of this patent is extended or adjusted under 35 U.S.C. 154(b) by 219 days.

(21) Appl. No.: 15/549,972

(22) PCT Filed: Jan. 18, 2017

(86) PCT No.: PCT/IB2017/000023
§ 371 (c)(1),
(2) Date: Aug. 9, 2017

(87) PCT Pub. No.: WO2017/125813
PCT Pub. Date: Jul. 27, 2017

(65) Prior Publication Data
US 2018/0021973 A1    Jan. 25, 2018

(30) Foreign Application Priority Data

Jan. 18, 2016    (GB) .................................. 1600882.3

(51) Int. Cl.
*B27C 5/10*    (2006.01)
*B25F 5/02*    (2006.01)
(Continued)

(52) U.S. Cl.
CPC ................ *B27C 5/10* (2013.01); *B23Q 11/00* (2013.01); *B23Q 35/10* (2013.01); *B25F 5/021* (2013.01);
(Continued)

(58) Field of Classification Search
CPC .... B27C 5/02; B27C 5/10; Y10T 409/306608
See application file for complete search history.

(56) References Cited

U.S. PATENT DOCUMENTS

| 2,852,051 A | 9/1958 | Bickner |
| 4,606,685 A | 8/1986 | Maier et al. |
(Continued)

FOREIGN PATENT DOCUMENTS

| DE | 3843912 | 6/1990 |
| EP | 0676264 | 10/1995 |
(Continued)

OTHER PUBLICATIONS

Darrell Morris: "Triton Dual Mode Precision Plunge Router TRA001", Mar. 21, 2012 (Mar. 21, 2012), pp. 1-62, XP055356831, Retrieved from the Internet: URL:http://go.rockler.com/tech/48271TritonRouterInstructions.pdf.

*Primary Examiner* — Matthew Katcoff
(74) *Attorney, Agent, or Firm* — Head, Johnson, Kachigian & Wilkinson, PC

(57) ABSTRACT

A power tool including a housing mounted to be moveable with respect to, and spaced from, a base, said housing including a motor to rotate a shaft which includes, at its free end, a tool holder for a tool, said shaft extending from the housing such that the tool holder is located at or adjacent to the base and can pass through an aperture in said base, said housing connected to the base by one or more support assemblies, and a sleeve provided to be positioned on the base and form therein an area in which the said tool and aperture in the base are located when performing work on a workpiece. Dust extraction apparatus can be connected and the base can be selectively provided with guide means and also includes attachment means to allow the power tool to be selectively located with a worksurface or a guide plate.

14 Claims, 17 Drawing Sheets

Figure 1A:
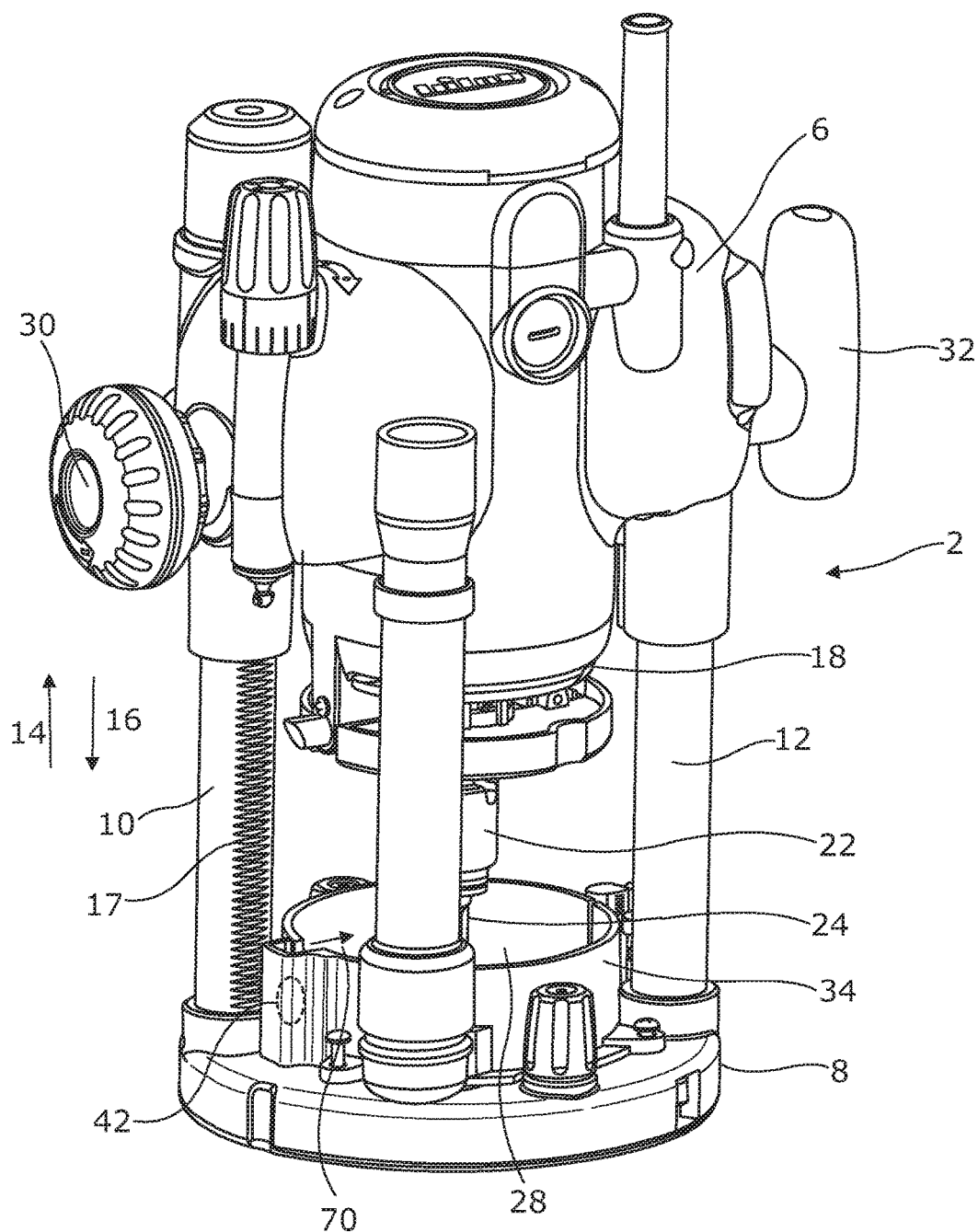

(51) Int. Cl.
 B23Q 11/00 (2006.01)
 B23Q 35/10 (2006.01)
 B23Q 17/24 (2006.01)
 B25H 1/00 (2006.01)

(52) U.S. Cl.
 CPC ...... *B23Q 11/0046* (2013.01); *B23Q 17/2404* (2013.01); *B25H 1/00* (2013.01)

(56) References Cited

U.S. PATENT DOCUMENTS

| | | | |
|---|---|---|---|
| 6,139,229 A | 10/2000 | Bosten et al. | |
| 7,290,575 B2 * | 11/2007 | Freese | B27C 5/10 144/136.95 |
| 7,290,967 B2 * | 11/2007 | Steimel | B23Q 11/0046 144/252.1 |
| 2008/0295918 A1 * | 12/2008 | Chung | B23Q 17/2404 144/154.5 |

FOREIGN PATENT DOCUMENTS

| | | |
|---|---|---|
| EP | 0698446 | 2/1996 |
| EP | 1366873 | 12/2003 |
| EP | 1839827 | 10/2007 |
| EP | 1886777 | 2/2008 |
| EP | 2000254 | 12/2008 |
| GB | 2453532 | 4/2009 |
| GB | 2464390 | 4/2010 |
| JP | 5815830 | 1/1983 |

\* cited by examiner

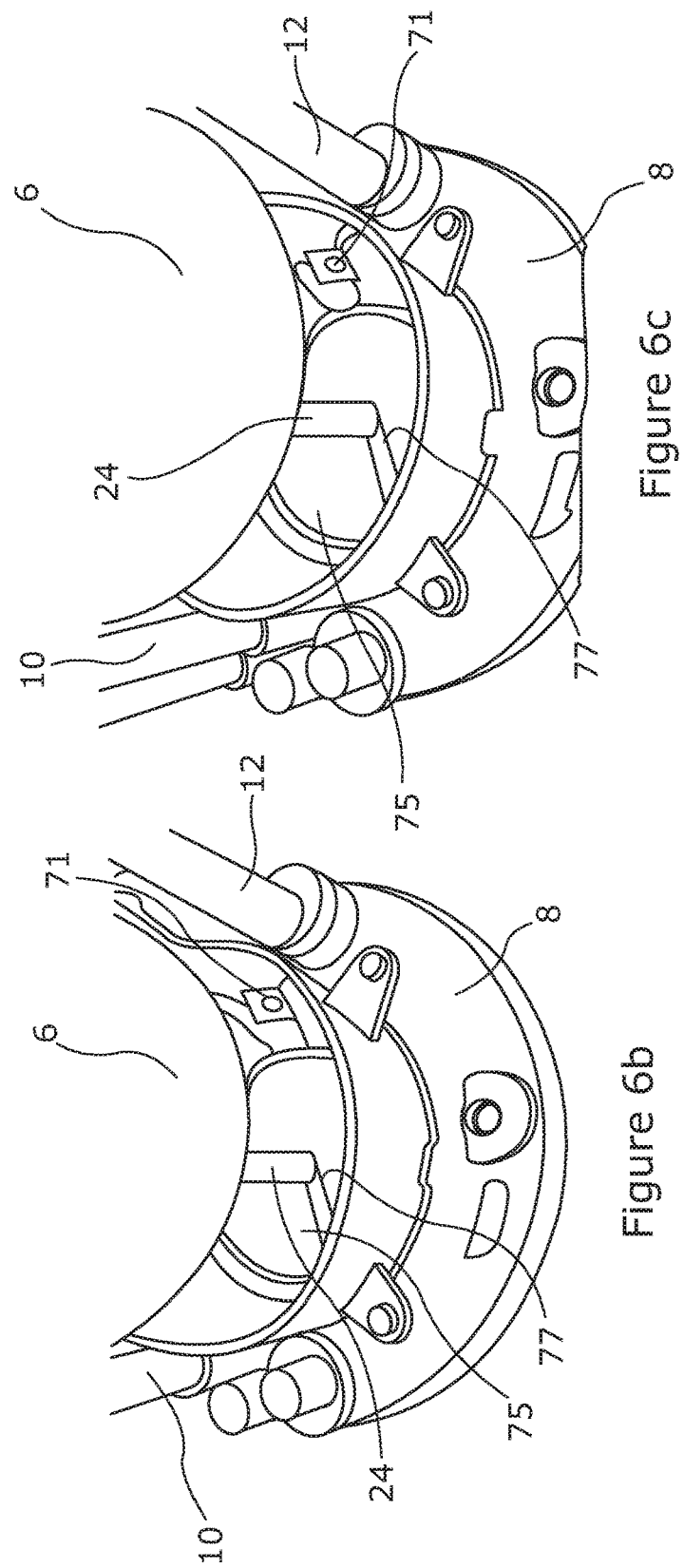

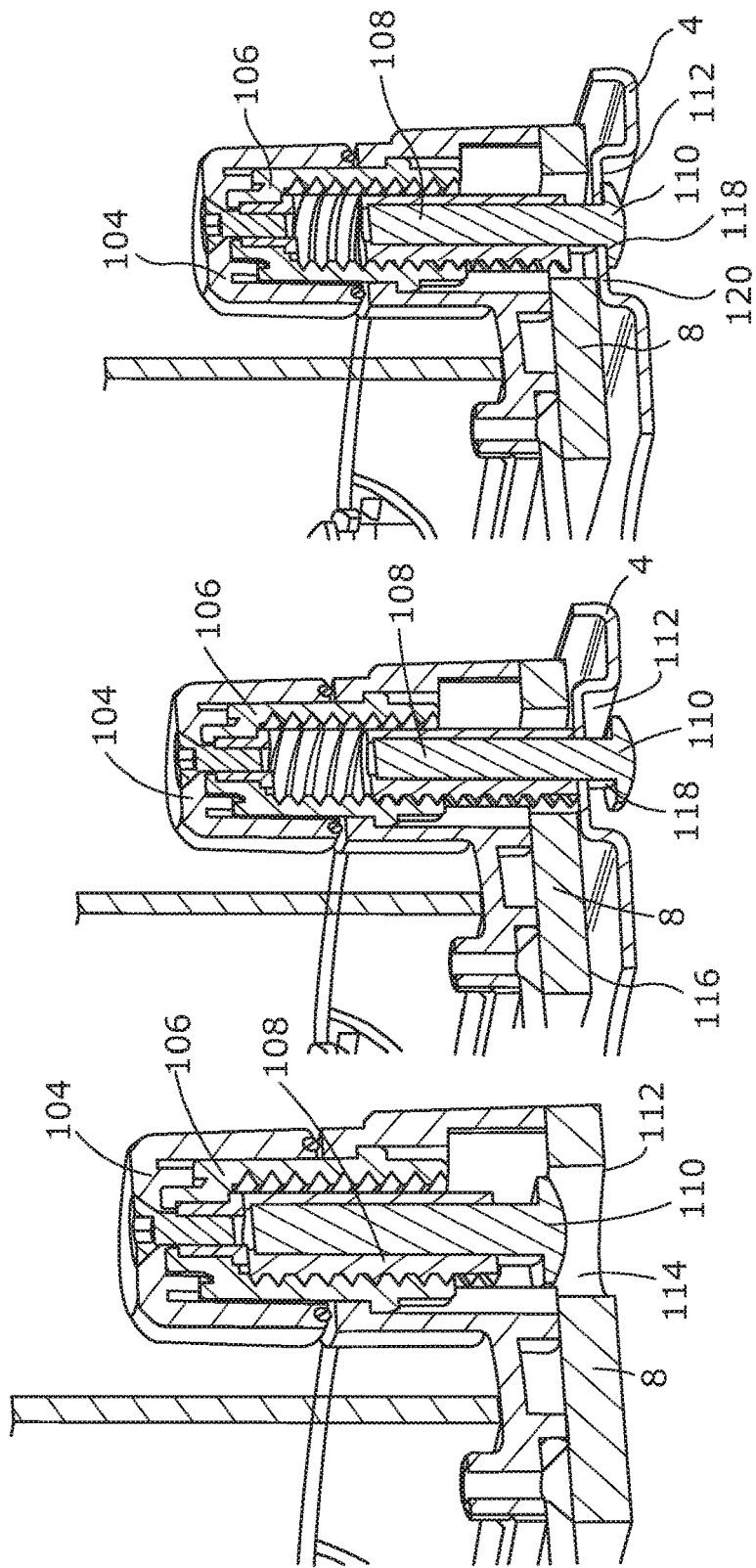

IMPROVEMENTS TO ROUTER APPARATUS

This invention relates to improvements relating to an electric power tool, and particularly, although not necessarily exclusively, power tools of a form commonly known as a router with the tool being capable of performing work on a workpiece via a rotating cutting tool. The router can typically be mounted for use above or below a work surface on which the workpiece is located. When in the configuration of use above the work surface, the movement of the tool is typically guided by hand, or alternatively the workpiece on which the work is being performed can be moved with respect to the tool which is held in a fixed position and when the tool is in the second configuration of use the tool is typically attached to the workbench and the movement of the housing of the tool with respect to the work surface and work piece is performed by a winding mechanism.

The router tool housing has a motor located therein which is provided in connection with a shaft on which a tool holder and cutting tool are mounted. The shaft, tool holder and cutting tool are aligned along the longitudinal axis of the shaft so that the shaft, tool holder and cutting tool are rotated about said axis. A base plate is connected to the housing by support assemblies and the cutting tool extends through an aperture in the base to perform the cutting operation on the workpiece which lies to the opposite side of the base from the housing.

The use of routers is well known and the same are used in large numbers on a worldwide basis. However problems persist in the use of the same.

Known problems exist with regard to the ability to effectively implement a dust extraction system with the base and to provide a dust extraction system which is sufficiently efficient to effectively remove dust and debris from the working environment around the cutting tool and the workpiece whilst being sufficiently flexible in its use so as to allow the same to be used in the different configurations of operation of the router tool. In conventional dust and debris extraction apparatus it can be found that the amount of dust and debris which is actually removed is quite limited and, at the same time, the dust and debris extraction components can limit visibility to the work environment at the base of the router tool and/or be obstructive to the use of the apparatus.

A first aim of the invention is to provide an improved dust and debris extraction system to be used with the tool. Visibility of the working environment around the tool and workpiece can be a problem in general and therefore a further aim of the invention is to provide improved visibility of the work of the tool when in progress.

In a first aspect of the invention there is provided a power tool which includes a housing mounted to be moveable with respect to, and spaced from, a base of the tool, said housing including a motor to rotate a shaft which includes, at its free end, a tool holder for a cutting tool, said tool holder located at or adjacent to the base and the base has an aperture through which a cutting tool attached to the tool holder can pass to perform work on a workpiece, said housing connected to the base by one or more support assemblies, and wherein a sleeve is provided to be positioned on the base and define therein an area in which the said cutting tool, tool holder and said aperture in the base are located when performing work on the workpiece, said sleeve including a side wall which depends from the base towards the housing.

In one embodiment the sleeve includes a lid portion which extends inwardly from the side wall towards the shaft.

In one embodiment the lid portion extends inwardly from the side wall towards the shaft at the edge of the side wall closest to the housing. Typically the lid portion acts as a shield to prevent or minimise dust and debris from entering the housing through ventilation apertures when the tool is used in a configuration in which the same is attached to the underside of the workbench.

In one embodiment the side wall includes at least one portion which extends outwardly to allow the passage of a component therealong as the housing is moved with respect to the base.

In an alternative embodiment the side wall includes at least one slot which extends between the opposing edges of the side wall to allow the passage of a component therealong as the housing is moved with respect to the base. In one embodiment the slot includes at least one flexible skirt which extends therealong and which is biased so as to close the slot until an opening force is applied thereto.

In either embodiment the said component is an auto spindle lock actuator.

In one embodiment, guide means are provided within the sleeve in order to encourage dust and debris which has collected in the space to move in a particular direction. Typically the movement is towards an exit port via which the dust and debris can be removed from the tool.

In one embodiment the guide means form a helical path for the dust and debris.

In one embodiment the sleeve is formed of first and second parts.

In one embodiment the sleeve is formed so as to extend substantially around the base.

In one embodiment the port is provided as part of, or is connectable to, a dust and debris extraction connector which includes a collar assembly for the selective location therewith of a flexible hose or a member with a channel and along either of which dust and debris from the sleeve can be removed.

In one embodiment the collar assembly includes a collar which is rotatable with respect to the connector so as to be range taking with respect to relative movement between the router tool and the dust and debris extraction apparatus.

Typically the fitment between the collar and the hose or the member is locked or an interference fit such that the same follow the movement of the collar.

In one embodiment, when the member is connected to the collar, the opposing end of the same acts as the connection point for the vacuum apparatus so that this connection point is at a location spaced further from the base than the collar which can provide improved access to the base and prevent the dust and debris apparatus causing an obstruction to the use of the tool.

In one embodiment the member is straight in form or, alternatively includes at least one bend intermediate the ends of the same. In either case the member is typically provided to be rotatable about its longitudinal axis when connected to the collar.

In one embodiment the connector is movable between first and second positions with respect to the port. The connector is provided in a first position when the tool is in a first configuration of use with the tool located to be operated on an upper side of a workbench and is provided in the second position with the tool located to be operated on the underside of the workbench. Typically the first and second positions are such as to allow the position of the position of the connector to be optimised with respect to the collection of the dust and debris and/or the connection of the extraction apparatus thereto and the particular configuration of the use of the tool at that time.

In one embodiment the movement of the connector between the first and second positions is linear and the base of the connector is weighted so as to allow the connector to automatically move to the correct one of the first and second positions for the use of the tool.

In one embodiment lighting means are provided as part of the tool, said lighting means located on the base.

In one embodiment the lighting means are located so as to create a shadow line formed by the tool and which shadow line extends to the point of contact between the tool and the workpiece so as to provide a visible guide to the operator of the tool of the width of the cut and/or the location at which the end of the tool contacts with the workpiece.

In one embodiment the lighting means is located so that the light emitted therefrom is passed along and through the sleeve which is formed of a transparent material.

In one embodiment the lighting means is an LED light source.

In one embodiment the lighting means is provided with power to operate from a power source located in the housing and a cable or wire connection to the same from the light source is located through one of the support assemblies.

In one embodiment the cable or wire is provided via a retractable spool which allows the length of the cable or wire connection to be adjusted to take into account the relative positions of the housing and the base of the tool. Typically the power source in this embodiment is the same as the power source for the electric motor which drives the rotation of the shaft.

In an alternative embodiment the power for the lighting means is provided from one or more batteries mounted on the base.

In one embodiment a bush component is provided to be selectively located with the base to act as a guide to the cutting tool and wherein the said component is releasably located with the base or a component fitted thereo by at least one engagement means which can be moved between a first engaging position and a second release position.

Typically the movement of the engagement means is by rotation about an axis. Typically the engagement means comprise securing means to secure a locking component to the base or a component located with the base, whilst allowing rotation of the locking means.

Typically said locking means has a portion which when in the engaging position extends inwardly beyond the periphery of the aperture to a greater extent than the remainder of the locking means so as to secure the bush component in position.

Typically a plurality of engagement means are provided at spaced locations around the periphery of the aperture.

In another embodiment of the invention the base is provided with retaining means to allow the base and hence tool to be selectively retained with a guide plate in one embodiment of use or a worksurface in another embodiment of use and this embodiment is most typically when the router is to be attached to the underside of the worksurface for use.

In one embodiment the retaining means comprise a gripping portion which is provided with an internal threaded formation or portion to receive a shaft with which a locating head is formed or attached. Typically the locating head is provided to be received in an aperture or passage formed on the guide plate or worksurface and the shaft passes through an aperture in the base and into the internal threaded formation of the gripping portion which is located on the opposite side of the base from the locating head.

Typically the shaft is in threaded engagement with the internal threaded formation of the gripping portion and preferably the pitch of the threaded engagement is such so as to allow the adjustment of the relative position of the shaft and locating head with respect to the base to be achieved with a relatively small number of turns of the gripping portion and thereby allow location and release of the base with either of the guide plate or worksurface to be achieved relatively quickly by the user whilst maintaining the required location force for safe use of the apparatus.

In a further aspect of the invention there is provided a power tool which includes a housing and a base, said housing mounted to be moveable with respect to, and spaced from, a base, said housing including a motor to rotate a shaft which includes, at its free end, a tool holder for a tool, said shaft extending from the housing such that the tool holder is located at or adjacent to the base and can pass through an aperture in said base, said housing is connected to the base by one or more support assemblies, and wherein lighting means are provided as part of the tool, said lighting means located on the base.

In a further aspect of the invention there is provided a power tool which includes a housing and a base, said housing mounted to be moveable with respect to and spaced from a base, said housing including a motor to rotate a shaft which includes, at its free end, a tool holder for a tool, said shaft extending from the housing such that the tool holder is located at or adjacent to the base and can pass through an aperture in said base, said housing is connected to the base by one or more support assemblies, and wherein a port is provided as part of, or is connectable to, a dust and debris extraction connector which includes a collar assembly for the selective location therewith of a flexible hose or a member with a channel and along either of which dust and debris from the sleeve can be removed and the collar assembly includes a collar which is rotatable with respect to the connector so as to be range taking with respect to relative movement between the tool and the dust and debris extraction apparatus.

In another aspect of the invention there is provided a power tool which includes a housing and a base, said housing mounted to be moveable with respect to and spaced from a base, said housing including a motor to rotate a shaft which includes, at its free end, a tool holder for a cutting tool, said shaft extending from the housing such that the tool holder is located at or adjacent to the base and said housing is connected to the base by at least one extendable assembly, said cutting tool provided to be movable through an aperture in the base to contact with and perform work on a workpiece located on the side of the base opposing the side at which the housing is located and a component is provided to be selectively located with the base to act as a guide to the cutting tool and wherein the said component is releasably located with the base, or a component fitted thereto, by at least one engagement means which can be moved between a first engaging position and a second release position.

In another aspect of the invention there is provided a power tool which includes a housing and a base, said housing mounted to be moveable with respect to and spaced from the base, said housing including a motor to rotate a shaft which includes, at its free end, a tool holder for a cutting tool, said shaft extending from the housing such that the tool holder is located at or adjacent to the base and said housing is connected to the base by at least one extendable assembly, said cutting tool provided to be movable through an aperture in the base to contact with and perform work on a workpiece located on the side of the base opposing the side at which the housing is located and wherein the base is provided with retaining means to allow the base and hence tool to be selectively retained with a guide plate in one embodiment of use or a worksurface in another embodiment of use and the retaining means comprise a gripping portion which is provided with an internal threaded formation or portion to receive a shaft with which a locating head is formed or attached and the position of which with respect to the base can be adjusted by rotation of the gripping portion.

Figure 1B:
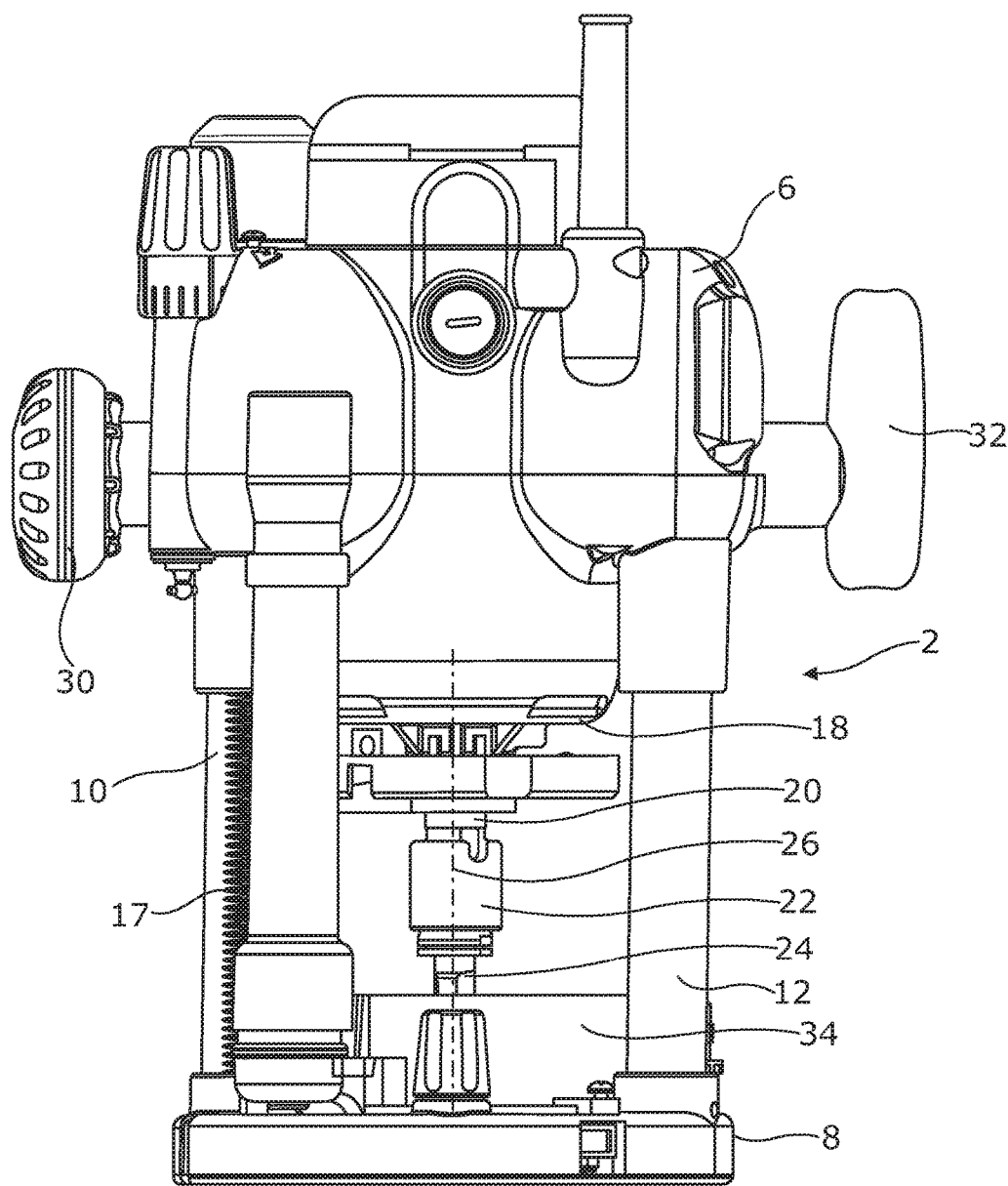
Figure 1C:
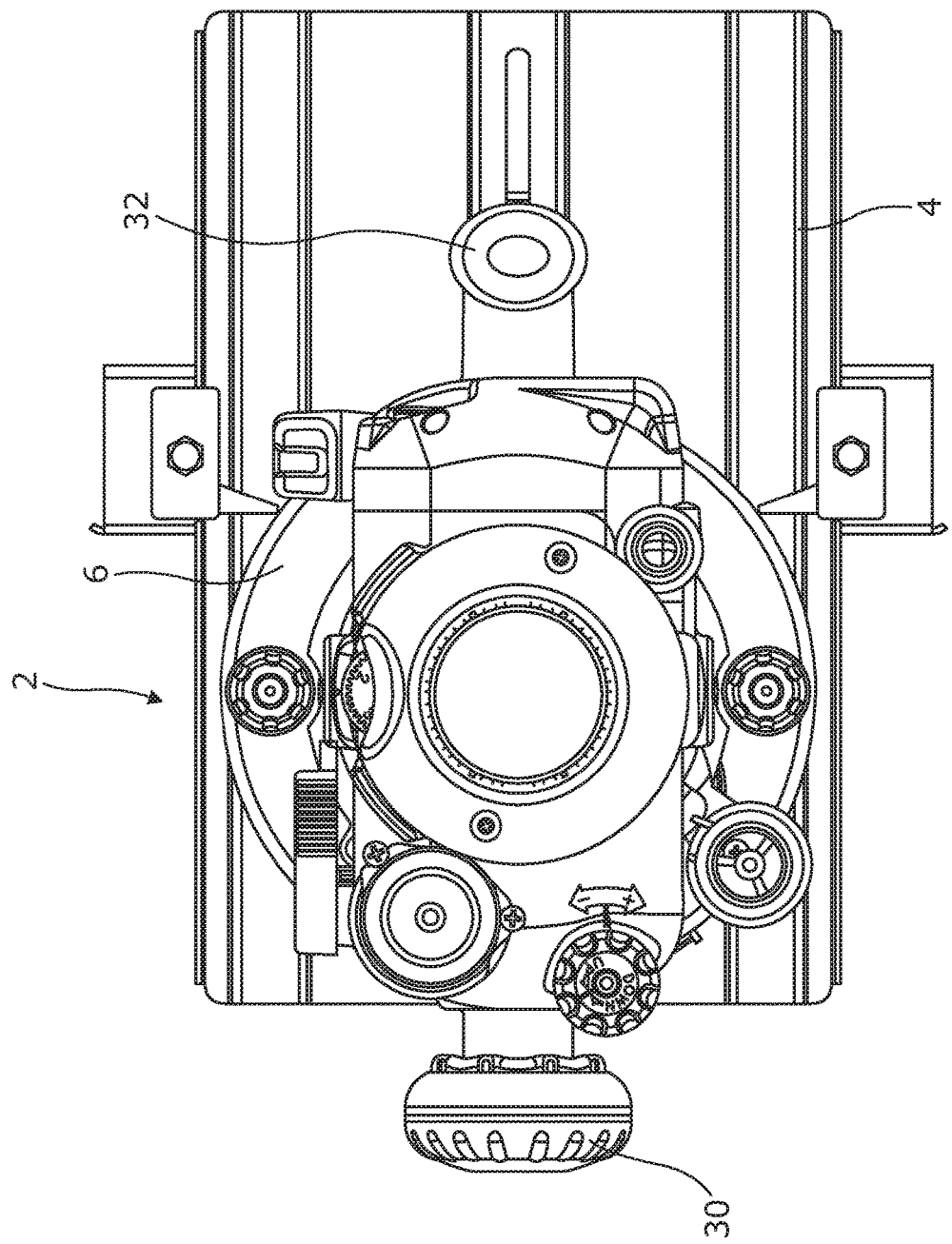
Figure 2:
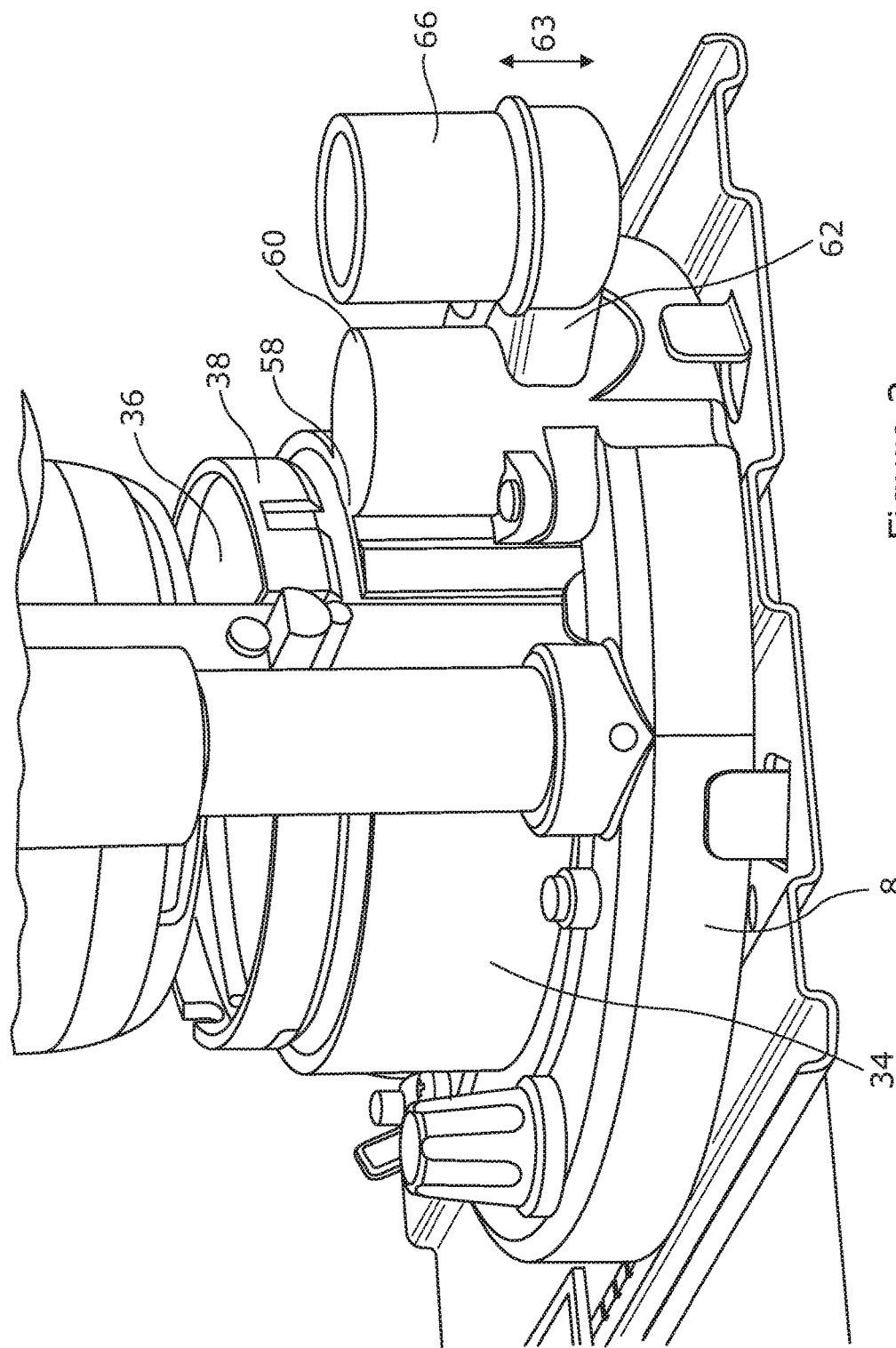
Figure 3A:
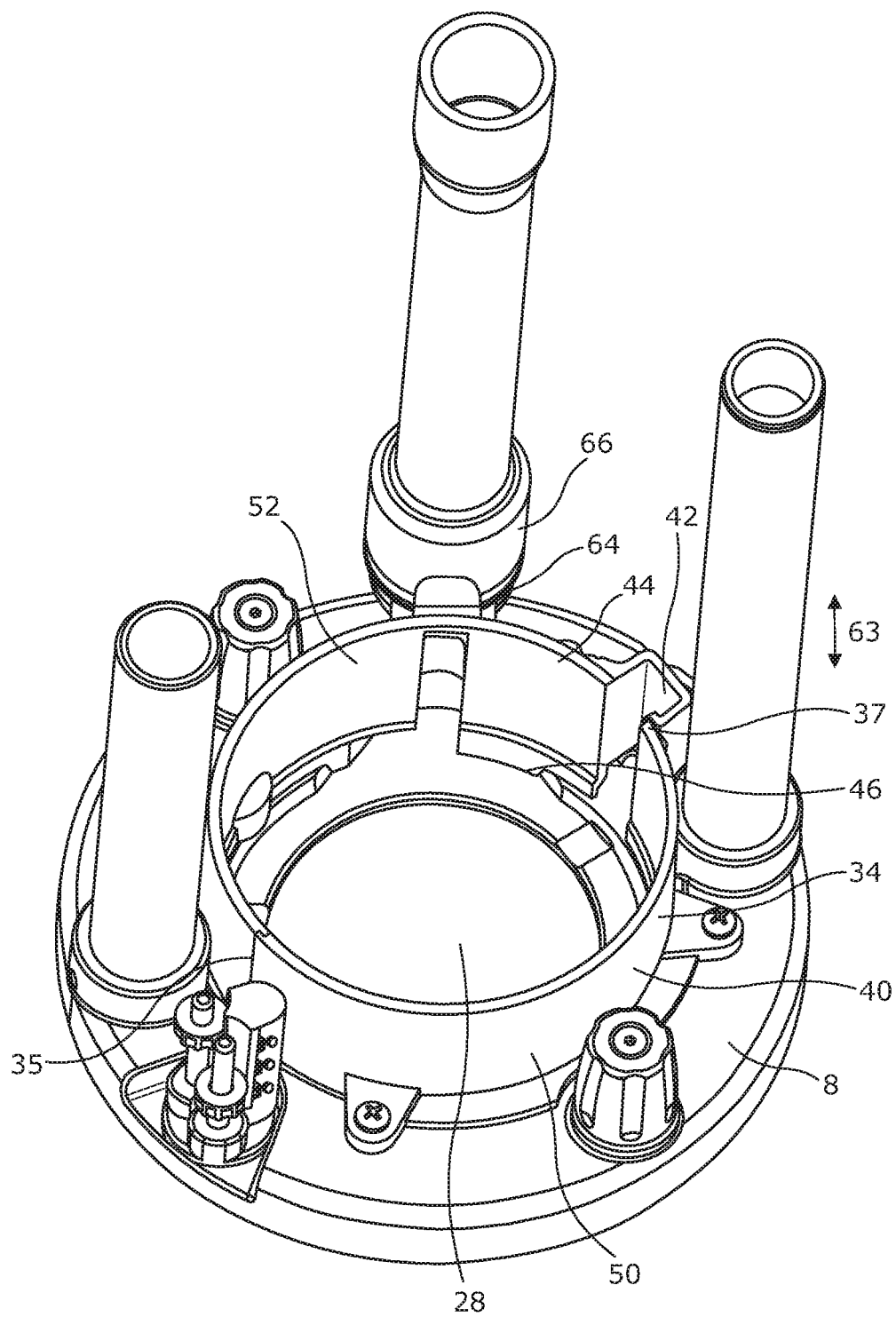
Figure 5B:
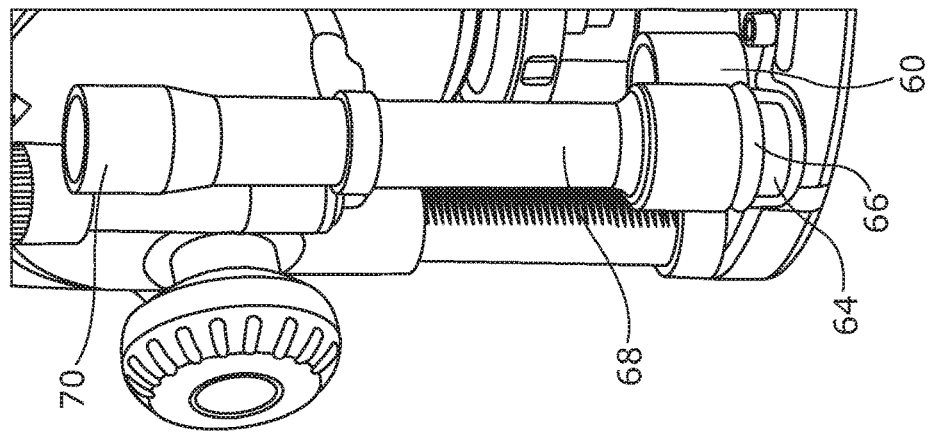
Figure 5A:
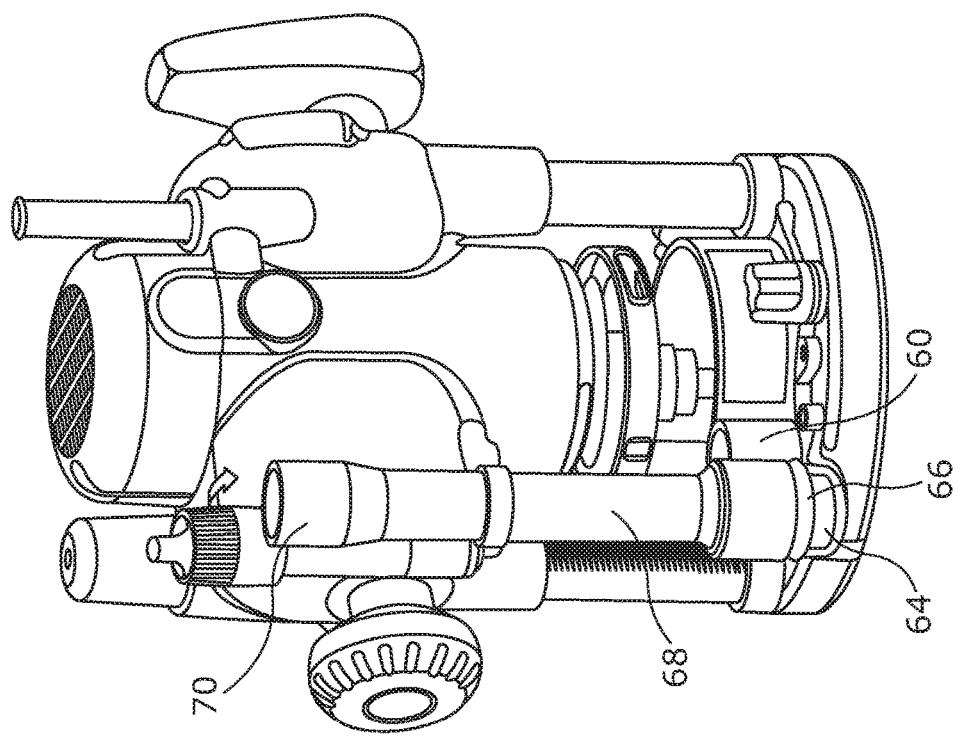
Figure 6A:
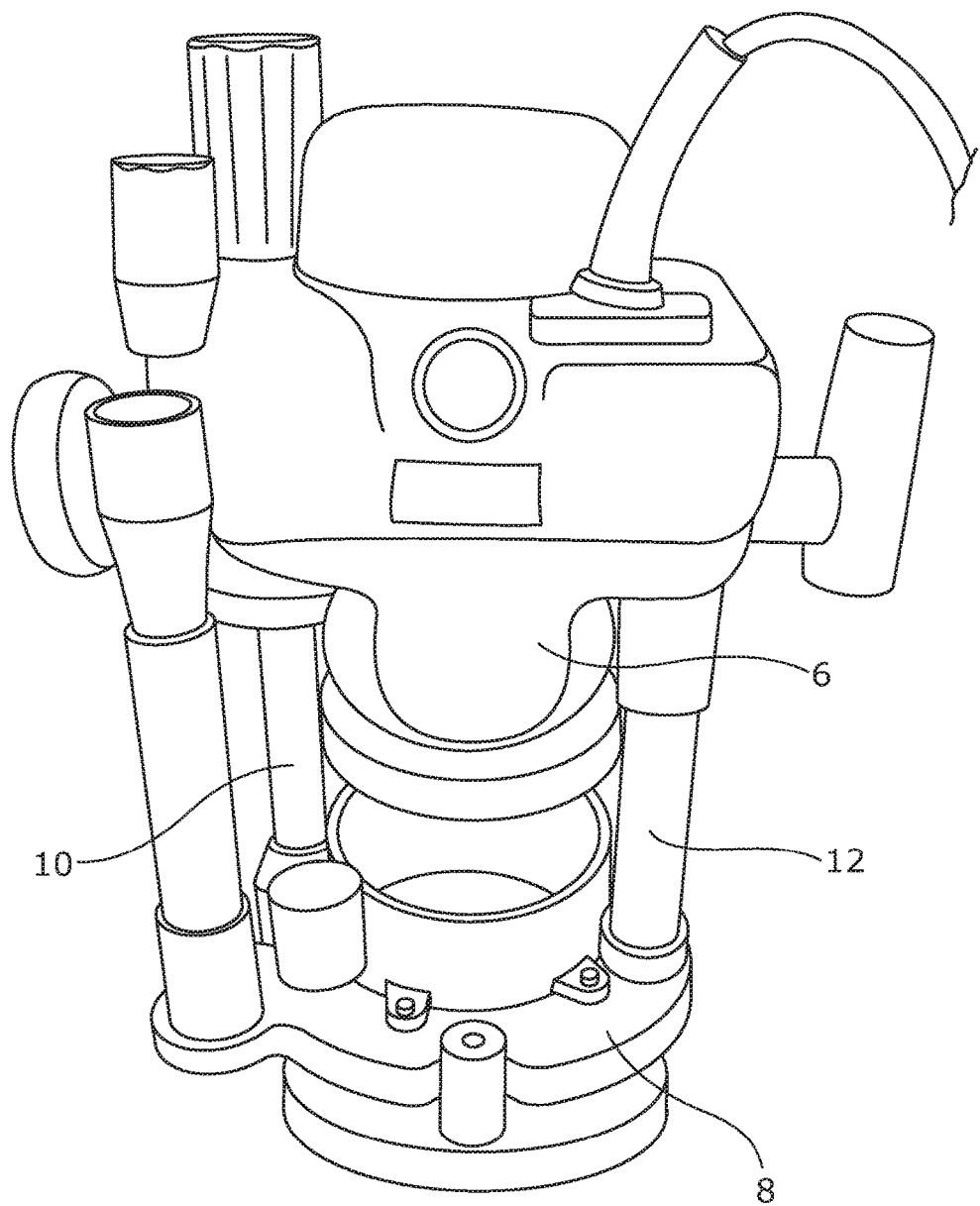

Specific embodiments of the invention are now described with reference to the accompanying drawings; wherein FIGS. 1a-c illustrate a perspective, elevation and plan views of first and second embodiments of a router tool in accordance with one embodiment of the invention; and FIG. 2 illustrates the sleeve and base of the router of FIGS. 1a-c in greater detail with a connector fitted thereto;

FIGS. 3a and b illustrate the router sleeve and dust and debris connector in attachment with the connector sleeve;

FIGS. 4a-d illustrate the sleeve components in accordance with one embodiment;

FIGS. 5a and b illustrate the connector of FIGS. 3a and b in attachment with an elongate member of the dust and debris extraction system;

FIGS. 6a-c illustrate an embodiment of the router with lighting means provided on the base;

FIGS. 7a-d illustrate an embodiment for the attachment of a bush guide with the base; and FIGS. 8a-e illustrate an embodiment for the attachment of the router base to the guide plate;.

Referring firstly to FIGS. 1a-b there is illustrated a router power tool 2 in accordance with the invention in one configuration of use and, in FIG. 1c, the router power tool is shown in a second configuration of use. The router can be used in two main positions. The first position is that shown in the FIGS. 1a-c in which the same is located on and above a work surface on which a workpiece for which the tool is to be used is located. In an alternative position the router can be turned through 180 degrees so that the base 8 is attached to the underside of the work surface so that effectively the router is used upside down and is located below the work surface.

In one configuration the base 8 may be attached to a guide plate 4 as shown in FIG. 1c, or may be attached directly to the work surface such as that provided as part of a workcentre of the type disclosed in the applicant's patent application GB2517640 and the contents of which are incorporated herein, or may be used in a freestanding mode as illustrated in FIGS. 1a-b.

The router includes a housing 6 which is connected to the base 8 by first and second extendable support member assemblies 10,12 so as to be movable in relation thereto as indicated by arrows 14,16 by driven or manual movement along one or more racks 17 formed on at least one of the members 10,12 and pinions located in the housing 6. From the underside 18 of the housing extends a shaft 20, which at its free end includes a tool holder 22. The tool holder receives a user selected cutting tool 24 and the shaft, tool holder and cutting tool are rotated about axis 26 by connection of the shaft with a motor (not shown) located within the housing 6.

The tool passes through an aperture 28 in the base 8 in order to engage and perform the work on the workpiece which lies to the underside of the base 8 which opposes the side of the base on which the housing is located. The tool also includes first and second handles 30,32 which are located on the housing 6 on opposing sides of the same and typically at, or adjacent to, the first and second extendable support assemblies 10,12 respectively. The handles are provided so as to allow the housing to be moved downwardly towards the base and generally to allow control of the tool in use.

Figure 3B:
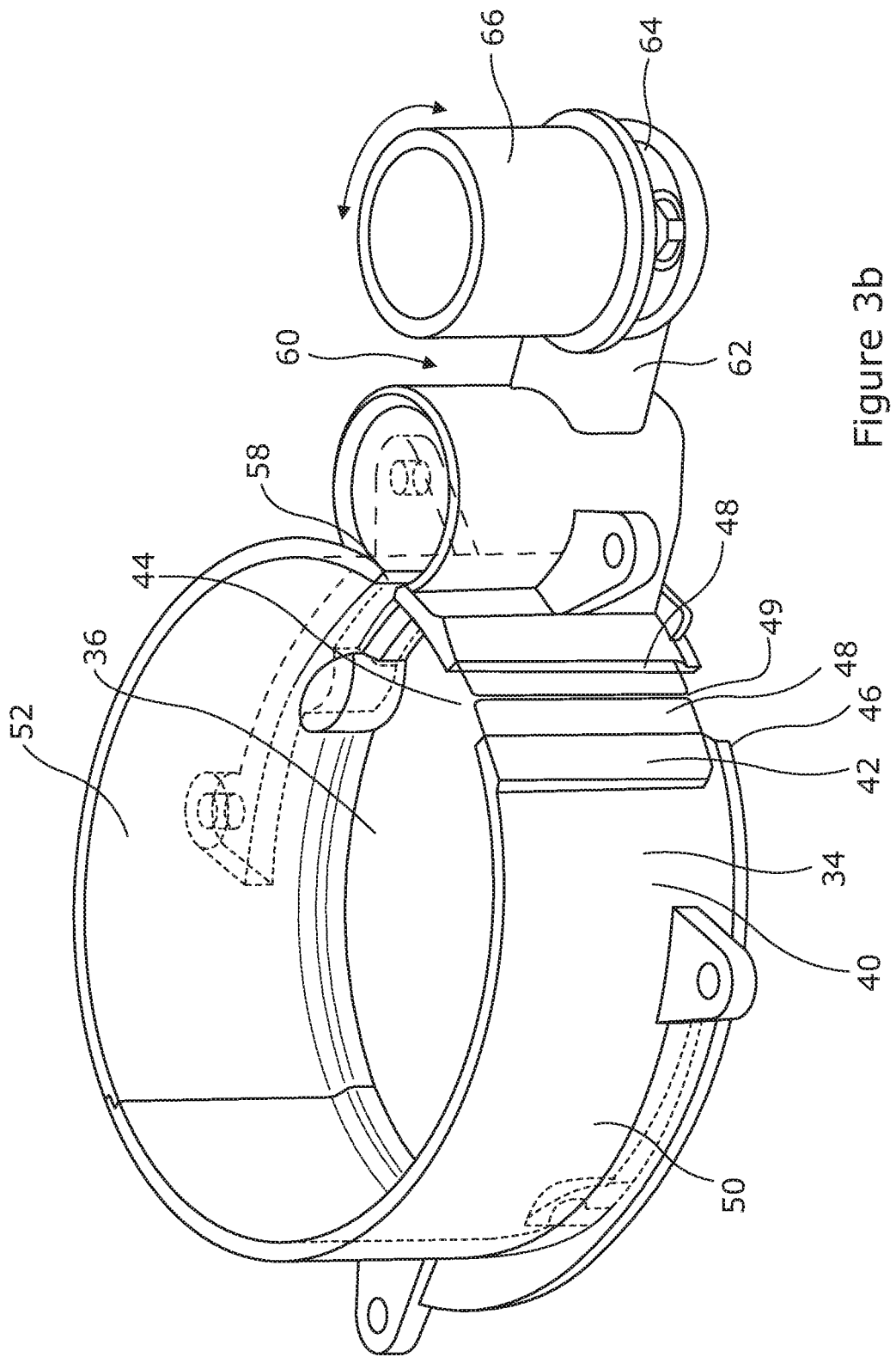
Figure 4A:
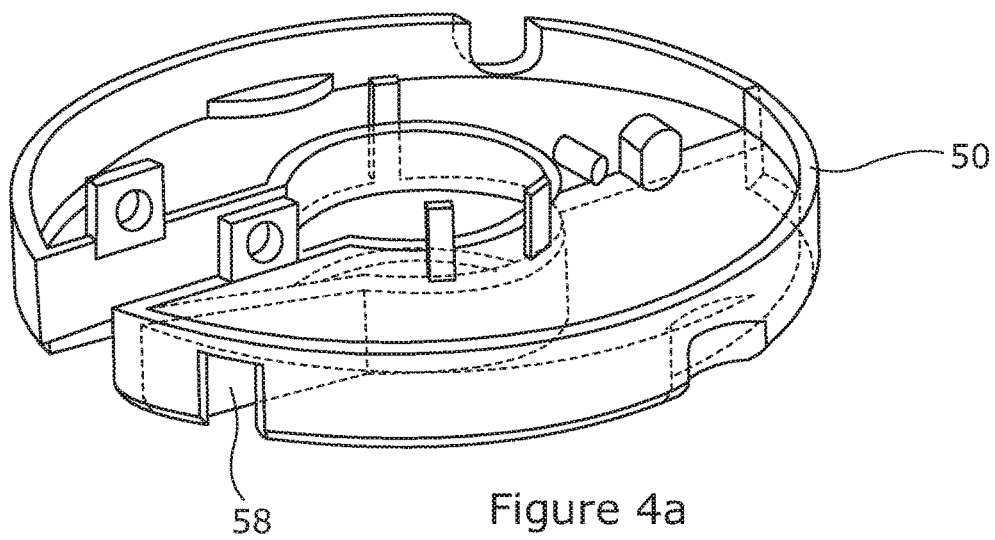
Figure 4B:
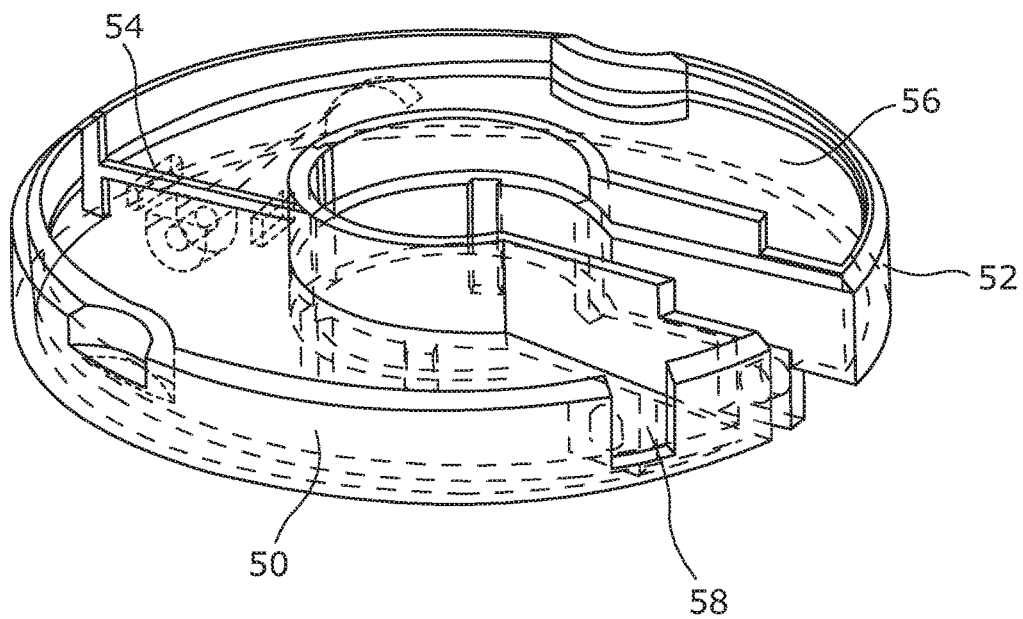
Figure 4C:
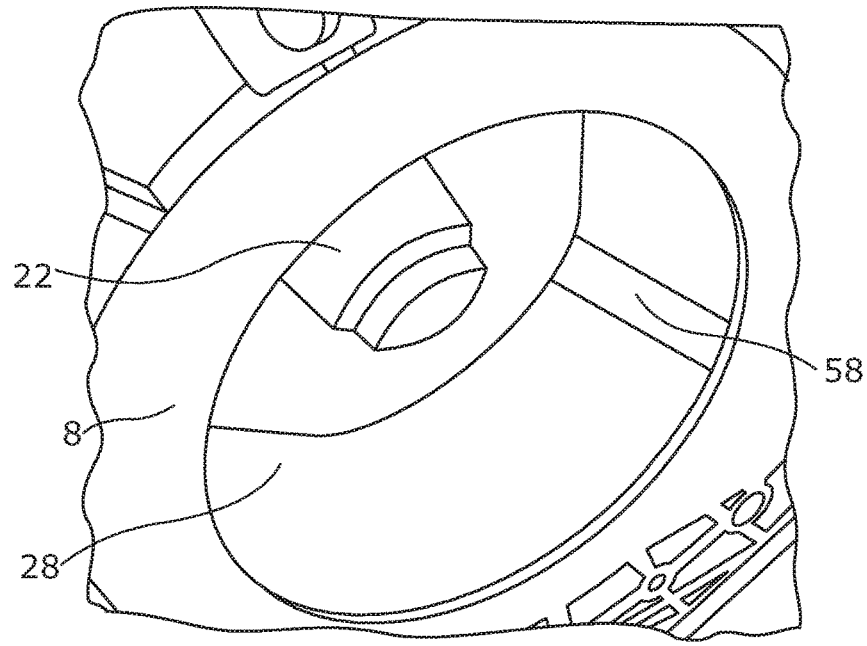
Figure 4D:
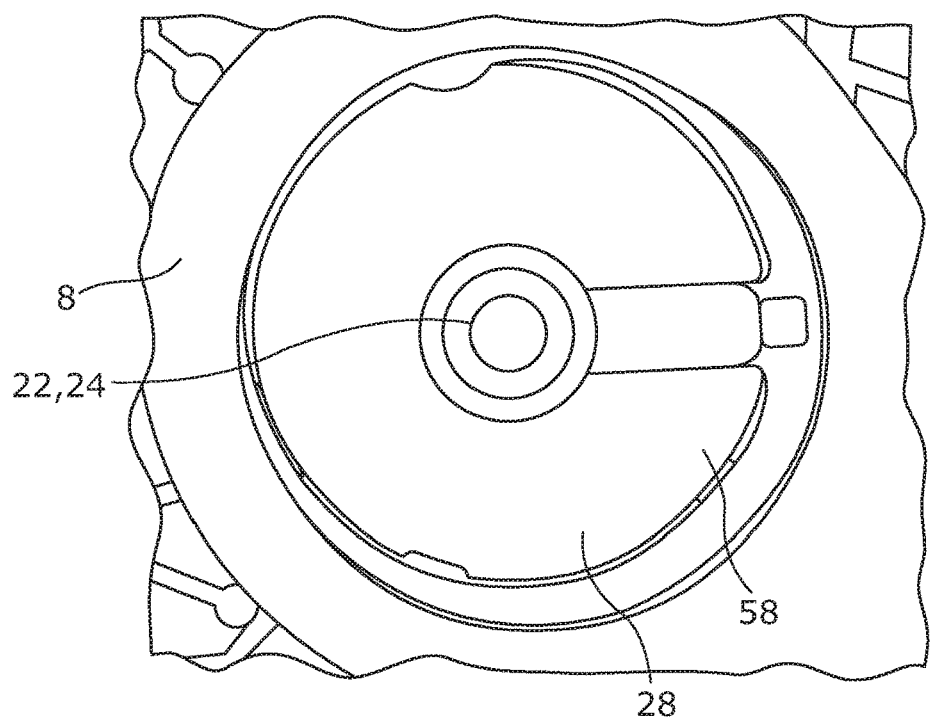

Turning now to FIG. 2 and FIGS. 3a-b there is illustrated the base 8 in more detail. The base 8 includes a sleeve 34 which is engaged and located on the base so that the sleeve defines an inner area 36 which is effectively enclosed when the power tool is in use. The cutting tool 24 and tool holder are located in the area 36 and the sleeve also typically at least partially encloses the aperture 28 in the base. The sleeve is formed of two halves 50, 52 which clip together at interfaces 35,37 and can also include a lid component 38 shown in FIG. 2 which tends to reduce the passage of dust and debris towards the housing 6, especially when the router is used and is attached to the underside of the work bench in the second configuration of use. In FIGS. 3a and b two different embodiments of the sleeve are shown. In FIG. 3a it will be seen that the side wall 40 of the sleeve includes a protrusion 42 which extends outwardly and which extends from the edge 44 of the sleeve to the opposing edge 46. In FIG. 3b as an alternative arrangement, a slot 49 is provided and flexible and resilient skirts 48 are provided which flex. In both embodiments the purpose is to allow the unobstructed passage of a component such as an auto spindle lock actuator provided on the tool to move in the direction of arrow 62 as the tool is used and in both embodiments the aim is to restrict the escape of dust or debris from the interior of the skirt.

As shown in FIGS. 4a-d the sleeve can be provided of the two parts 50, 52 which are joined together along axis 54. A helical guide arrangement 56 is provided which depends inwardly from the side wall and which acts to form a path to encourage the movement of dust and debris within the area 36 towards a port 58 via which the dust and debris can leave the area 36. The port can be provided in the form of a slot and there is provided a connector assembly 60 as shown in FIGS. 2a-3b which is slidable in the direction of arrow 63 with respect to the slot. The connector assembly 60 is provided in a first position when the tool is in the first configuration of use with the tool located to be operated on an upper side of a work surface and is provided in the second position when the tool is located to be used on the underside of the work surface. Typically the first and second positions of the connector assembly 60 are such as to allow the position of the connector to be optimised with respect to the collection of the dust and debris from the area 36. The base of the connector assembly 60 may be weighted so as to allow the connector to automatically move to the correct one of the first and second positions for the use of the tool.

The connector assembly is provided with a body with a channel 62 which extends to a collar assembly including a fixed portion 64 and a rotatable collar portion 66. The collar portion 66 is provided for the reception of an end of a dust and debris extraction means channel 68 in the form of a hose (not shown) or an elongate member as shown in FIGS. 5a and b. The elongate member 68 includes a channel therealong which allows dust and debris from the area 36 to reach an opening end 70 which is remote from the area 36. An extraction system can be connected to the opening end 70 to allow the dust and debris to pass through the opening and be removed for disposal. The positioning of the opening end 70 remote from the base 8 means that the vacuum system which is attached thereto does not hinder the visibility of the base 8, cutting tool 24 and area 36 to the operator of the tool and therefore allows the operator to have a clearer view of the performance of the desired work using the tool. The sleeve is typically formed of a transparent material.

The visibility is further improved by the provision of a light source 71 in the base as illustrated in FIGS. 6a-c and preferably the light source is provided to have a constant focal length regardless of the particular relationship and distance between the housing 6 and the base 8. This is contrary to conventional light source means which are typically located on the housing 6 and, as the housing is moved with respect to the base, so the focus and intensity of the light at the base 8 varies. In the current invention as the light source 71 is located at the base 8, the light illumination intensity at the base 8 remains the same. In the embodiment shown, the power for the operation of the light source is linked to the power supply in the housing 6 for the operation of the motor, by cable or wires which pass along the support member 12. In FIG. 6b and it is shown that with the light source 71 illuminated and located on the base, the cutting tool 24 when in contact with the workpiece 75, creates a shadow line 77 which assists in indicating to the user the width of cut and the pint at which the cutting tool contacts the work piece.

Figure 7A:
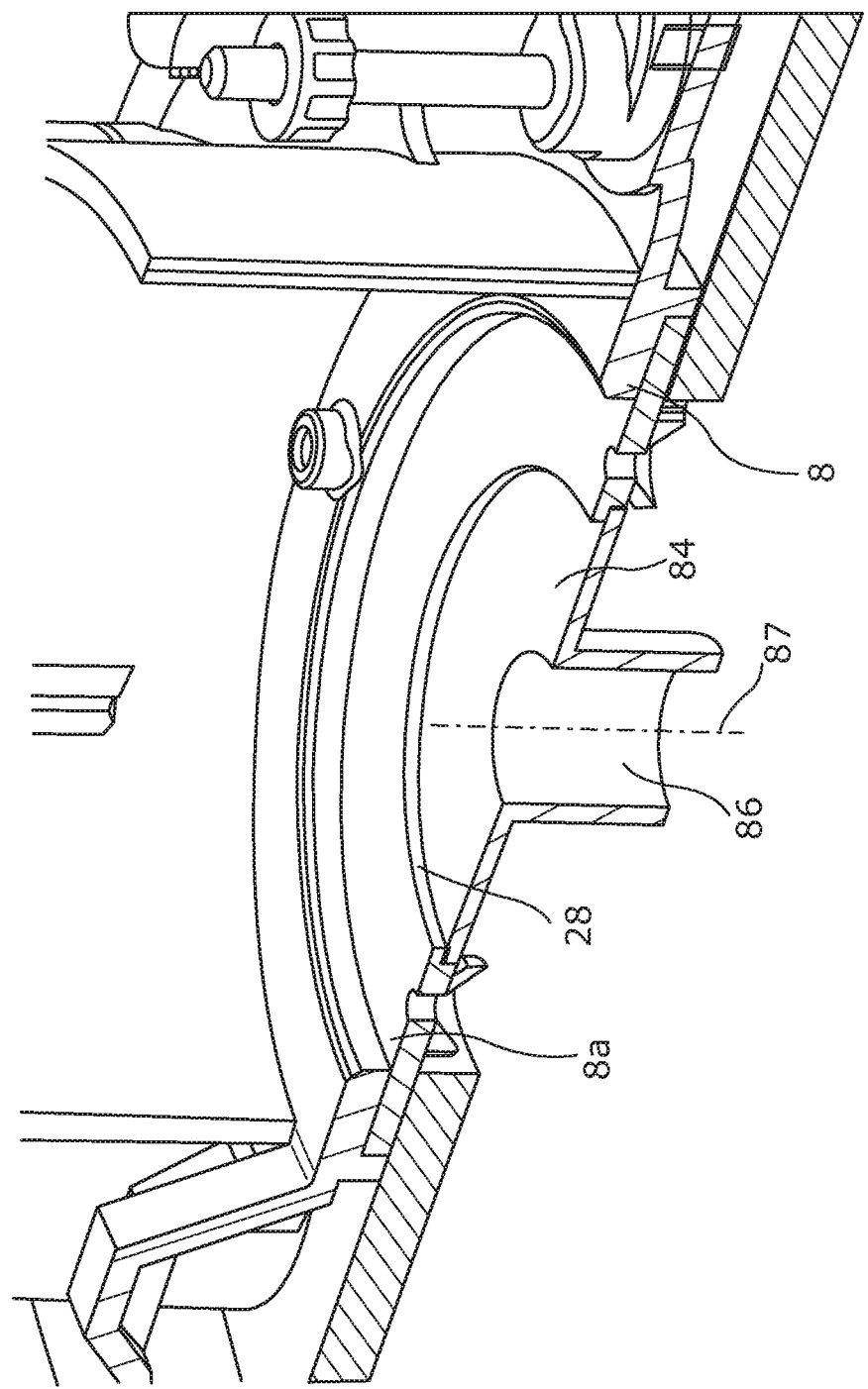
Figure 7B:
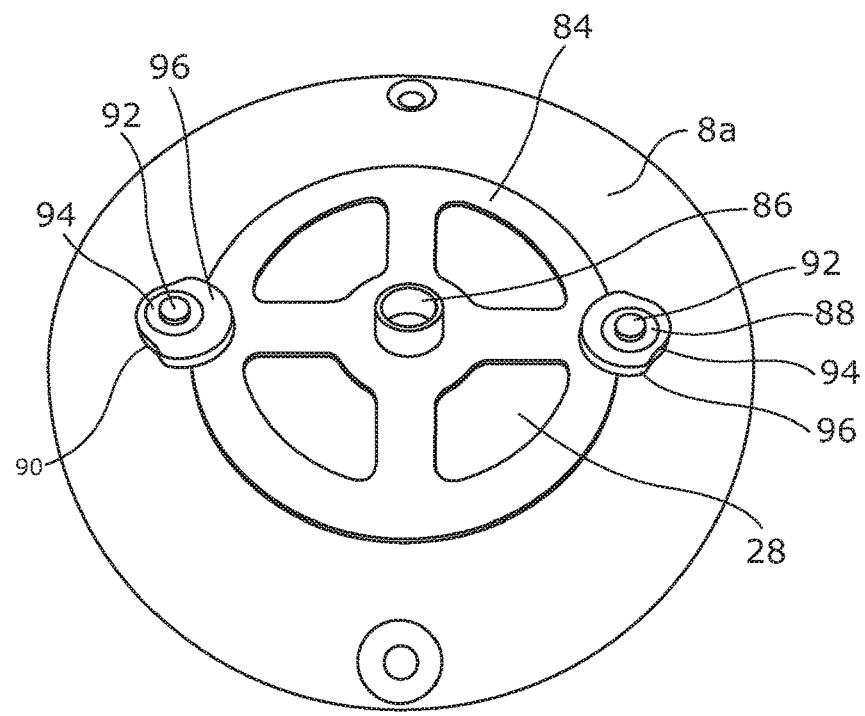
Figure 7C:
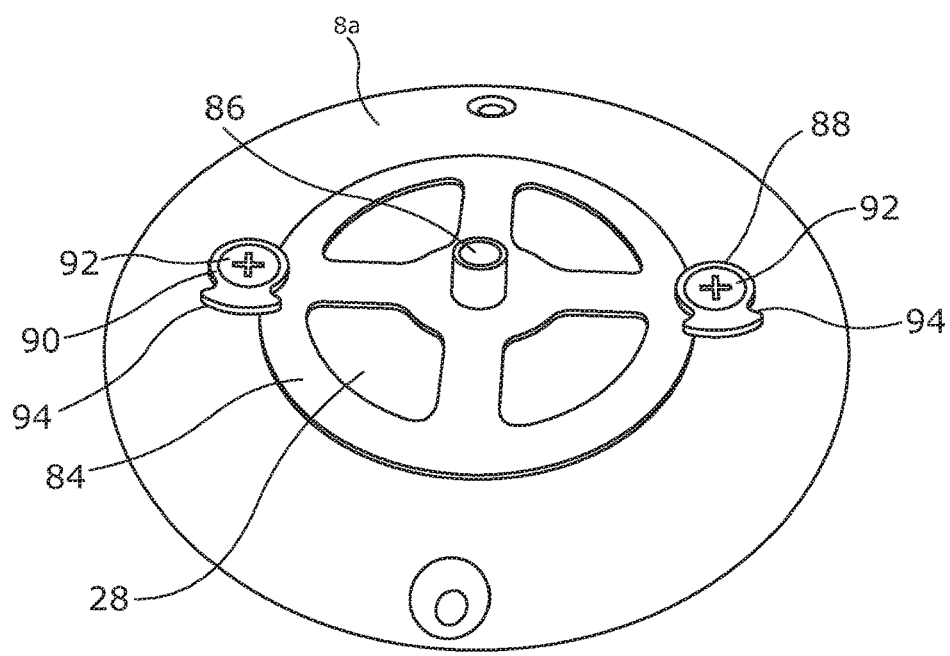
Figure 7D:
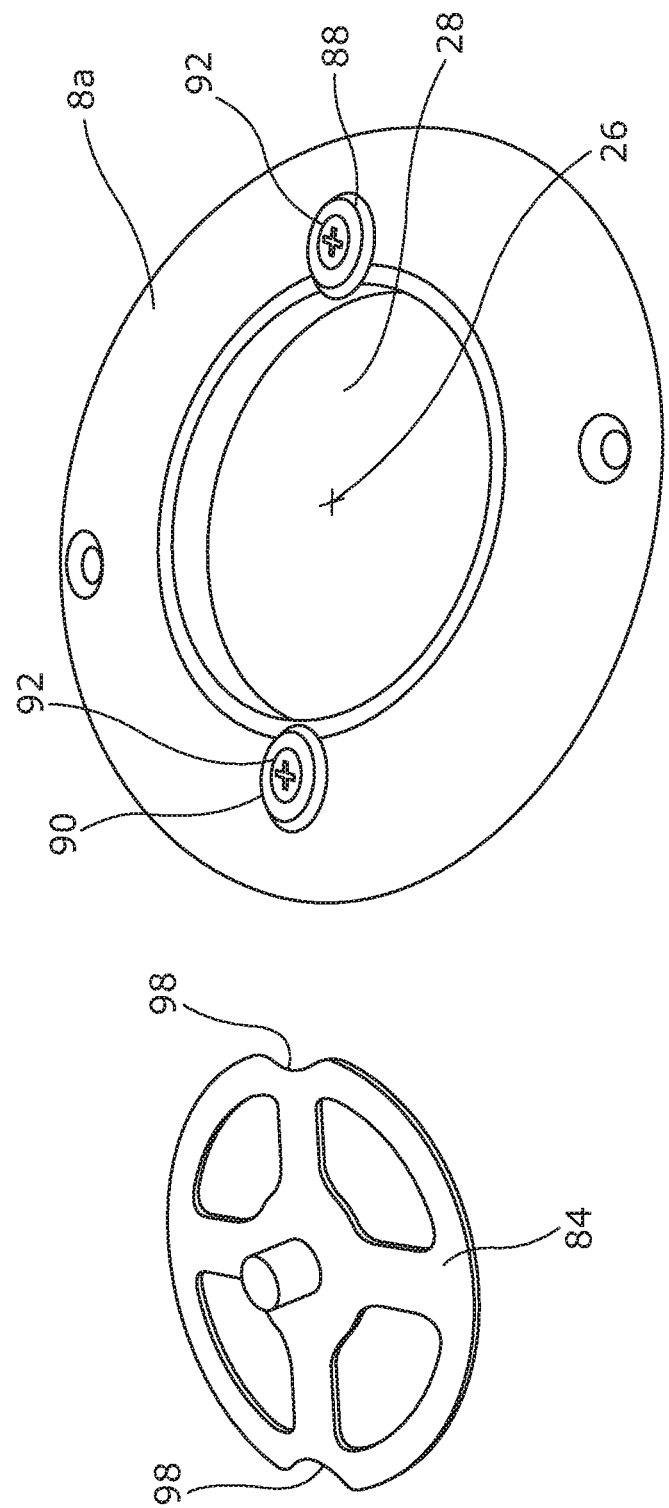
Figure 8A:
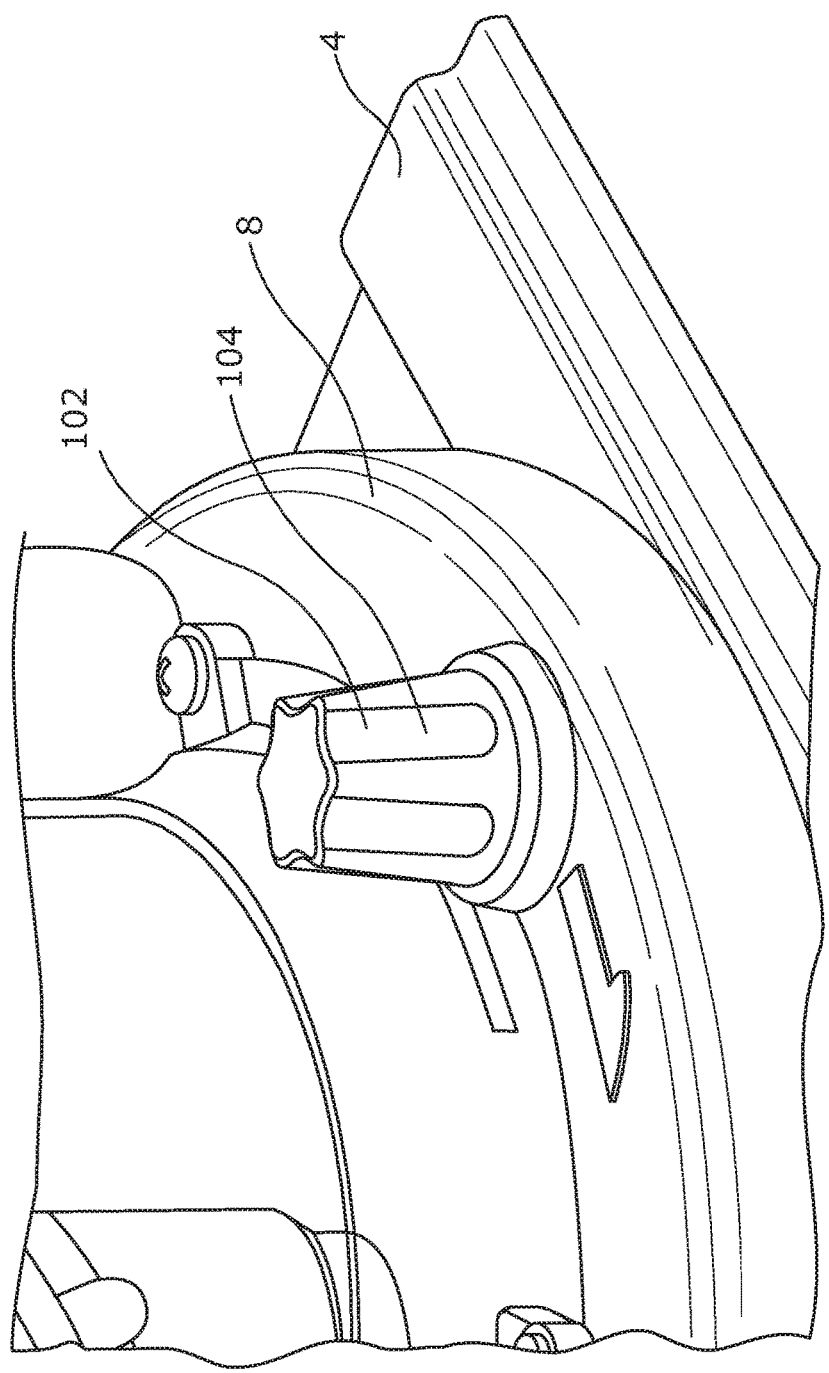
Figure 8B:
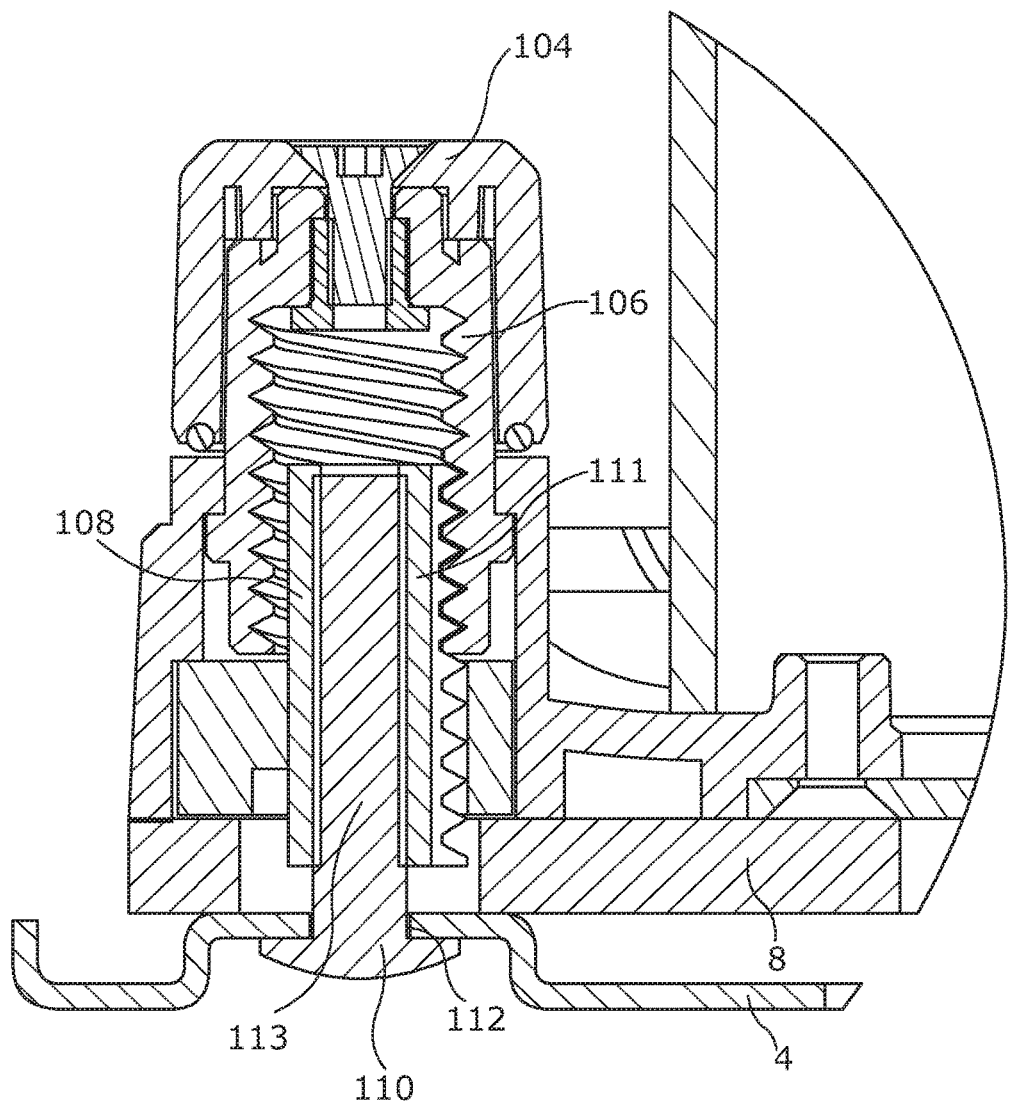

Turning now to FIG. 7a there is illustrated the base 8 in cross section along its centreline with a base component 8a in location therewith and which is also shown in cross section. The component 8a can be selectively engaged with the base as shown in FIG. 7a and is shown separated from the base in FIGS. 7b-d for ease of illustration. A bush 84 is shown in an in-use position with the component 8a in FIGS. 7a-c and a released position in FIG. 7d. It will be seen that when in the in use position the bush 84 provides a guide aperture 86 for the cutting tool 24 to pass therethrough along the axis 87. The bush 84 sits in the base aperture 28 which is reduced in size by the base component 8a. As the bush 84 may be selectively used, and also there will typically be a range of bushes with different sizes of guide apertures 86 for selective use depending on the size of cutting tool 24 in use at that time, there is a need to be able to move bush 84 between the in use position and the removed position frequently. Also, as the bush 84 acts as a guide when in use, the location of the same is required to be accurate whilst, at the same time, requiring the minimum time and effort to engage and release the same. This is achieved in the current invention by providing first and second engagement means 88,90 which are secured to the base component 8a by screws 92 and which include locking means 94 which have a portion 96 which, when rotated to overlie the aperture 28, engage with the bush 84 as shown in FIG. 7b and serve to retain the same in the in use position. To release the bush 84, the locking means 94 can be rotated so that the portion 96 is moved from overlying the bush 84 as shown in FIG. 7c and the bush 84 can then be released. In order to further improve the release, the bush may be provided with indents 98 as shown in FIG. 7d which are located to match with the location of the engagement means 88, 90. A further advantage is that as the component 8a is located centrally axially of the aperture 28, so, as the bush is accurately located by the engagement means in accordance with the invention, the centre axis 87 of the guide aperture 86 in the bush will be located along the axis 26 of the aperture 28 and cutting tool 24 shown in FIG. 1b so that accuracy of cut can be ensured.

Turning now to FIGS. 8a-e there is illustrated the provision of retaining means to locate the base 8 of the router with a guide plate 4 rather than the worksurface. The retaining means 102 comprise a gripping portion 104 which is provided with an internal threaded formation 106 which receives a shaft 108 on which a locating head 110 is formed or attached. The shaft 108 can be formed, as is shown with reference to FIG. 8b, as two parts, a first part 111 in threaded engagement with formation 106 and a second part 113 in which the locating head is formed and which is in threaded engagement with the first part 111. Alternatively the shaft 108 can be provided as a single unitary component with the locating head 110 and in threaded engagement with the formation 106.

Typically the locating head 110 can be moved to a number of positions by rotation of the gripping portion 104. In FIG. 8c the locating head 110 is shown in a fully retracted position in which the same is withdrawn into an aperture 114 in the base 8 so that the same does not protrude from the base and the base can therefore be positioned directly onto a workpiece. FIG. 8d shows the locating head 110 in a fully extended position and thereby allows the same to be moved into, typically, a keyhole aperture 112 in the guide plate 4 and the guide plate is then positioned in the gap between the underside 116 of the base 8 and the top face 118 of the locating head 4. When in position, the gripping portion 104 can then be rotated to draw the locating head 110 towards the base 8 and thereby tighten the top face 118 of the locating head against the guide plate 4 surface 120 and so fasten the guide plate and the base 8 together for use as illustrated in FIG. 8e.

It should be appreciated that the same attachment apparatus and method can be used when a work surface is substituted in position instead of the guide plate 4 and the router is positioned in an inverted position on the underside of the worksurface.

The provision of the threaded pitch between the internal threaded formation 106 and the shaft 108 being relatively high reduces the number of turns of the gripping portion 104 which are required to move the locating head between the positions shown in FIGS. 8c-e and so make the change of the condition more quickly achievable than with conventional mechanisms.

There is therefore provided a router power tool which has significantly improved dust and debris collection and an improved light source, all of which act, alone or in combination, to increase the visibility of the working of the tool at the base.

The invention claimed is:

1. A power tool comprising:
a housing mounted to be moveable with respect to, and spaced from, a base of the tool, said housing including a motor having a shaft on which is mounted, at its free end, a tool holder for a cutting tool, said tool holder located at or adjacent to the base and the base has an aperture through which a cutting tool attached to the tool holder can pass to perform work on a workpiece, said housing connected to the base by one or more support assemblies, and wherein a sleeve is provided to be positioned on the base and define therein an area in which the said cutting tool, tool holder and said aperture in the base are located when performing work on the workpiece, said sleeve including a side wall which depends from the base towards the housing and wherein guide means are provided within the sleeve to encourage dust and debris which has collected in the said area to move towards an exit port in said sleeve via which the dust and debris is removed.

2. A power tool according to claim 1 wherein the sleeve includes a lid portion which extends inwardly from the side wall towards the shaft.

3. A power tool according to claim 1 wherein the side wall includes at least one portion which extends outward radially to allow the passage of a component therealong as the housing is moved with respect to the base.

4. A power tool according to claim 1 wherein the guide means form a helical path for the movement of the dust and debris therealong.

5. A power tool according to claim 1 wherein the port is provided as part of, or is connectable to, a dust and debris extraction connector which includes a collar assembly for the selective location therewith of a channel along Which dust and debris from the sleeve is removed, said collar assembly including a collar which is rotatable with respect to the connector and the fitment between the collar and the channel allows the channel to follow the movement of the collar.

6. A power tool according to claim 5 wherein a first end of the channel is connected to the collar and the opposing end of the channel acts as a connection point for vacuum apparatus, said connection point is at a location spaced further from the base than the collar.

7. A power tool according to claim 5 wherein the connector is movable between first and second positions with respect to the port.

8. A power tool according to claim 1 wherein lighting means are located on the base.

9. A power tool according to claim 8 wherein the lighting means are located so as to create a shadow line formed by the cutting tool which extends from a position at or adjacent to the point of contact of the cutting tool with the workpiece to provide a visible guide of the width of the cut or the location at which the end of the tool contacts with the workpiece.

10. A power tool according to claim 8 wherein the lighting means are located so that the light emitted therefrom is passed along and through the sleeve which is formed of a transparent material.

11. A power tool according to claim 8 wherein the lighting means are provided with power from a power source located in the housing and a cable or wire connection to the power source passes through one of the support assemblies.

12. A power tool according to claim 1 wherein a bush component is provided to act as a guide to the cutting tool, said component releasably located with the base, or a component fitted thereto, by at least one engagement means which is movable between a first engaging position and a second release position.

13. A power tool according to claim 12 wherein the movement of the engagement means is by rotation about an axis and the engagement means include securing means to secure a locking means to the base or a component located with the base, whilst allowing rotation of the locking means.

14. A power tool according to claim 1 wherein the base is provided with retaining means to allow the base and hence power tool to be selectively retained with a guide plate or a work surface, said retaining means include a gripping portion which is provided with an internal threaded formation or portion to receive a shaft with which a locating head is formed or attached, said locating head received in an aperture or passage formed on the guide plate or work surface and the shaft passes through an aperture in the base and into the internal threaded formation of the gripping portion which is located on the opposite side of the base from the locating head.

* * * * *